3,014,897
STEREOSPECIFIC POLYMER AND METHOD OF PREPARING
William Hodes, Stamford, Conn., assignor to American Cyanamid Company, New York, N.Y., a corporation of Maine
No Drawing. Filed Apr. 30, 1958, Ser. No. 731,864
2 Claims. (Cl. 260—80.5)

This invention relates to polymeric materials of the type which have a substantially ordered or oriented molecular structure, i.e. crystalline or crystallizable polymers. More particularly, the present invention relates to methylstyrene polymers in a specified ortho, meta, and para isomer ratio and to the method for preparing polymers of this type.

The copolymers with which the present invention deals have a stereospecific arrangement. Stereospecific polymers are those polymers distinguished by a regularity of configuration either with respect to the main backbone chain of the polymer or with respect to the pendant group or groups attached to the main chain of the polymer; or with respect to both the main chain and the pendant group or groups. Examples of regularity of pendant groups are the isotactic polymers and syndiotactic polymers where similar groups are on the same side or alternate sides of the backbone chain, respectively.

Stereospecificity in a polymer allows for a closer packing of the molecules and is characteristic of crystallinity which imparts to the polymer properties such as increased density and strength which are markedly distinguishable from the usual nonstereospecific or random polymers commonly derived by conventional free radical type polymerization. The distinctions of the stereospecific copolymers obtained according to the invention over random type polymers obtained through free radical polymerization is also manifested by other improved mechanical, chemical, thermal and electrical properties such as greater rigidity and higher softening point, for example.

It is an object of the present invention to provide a novel composition of matter comprising stereospecific crystallizable and crystalline polymers of methylstyrene having ortho, meta and para isomer ratios in specified proportions. A further object is to provide a method of preparing polymers of this type. Other objects and advantages will become apparent as the description of the invention proceeds.

The stereospecific polymers obtained according to the invention possess a higher melting point (above 200° C.) as compared to conventional polymers prepared by random polymerization having a melting point normally below 120° C. The crystalline methylstyrene polymer is highly useful as thermally stable molding powders, for example. The polymeric product of the invention is also useful in the formation of fibers and as reinforcements for thermosetting molding compounds. The advantages of crystallinity in these polymers is reflected by a higher softening point, greater structural stability, less brittleness, as well as improved chemical and solvent resistance, superior impermeability to gases and a high melting point.

According to the invention, I have discovered that when the ring-substituted methylstyrene in mixtures comprising from about 10 to 40 weight percent ortho isomer, 60 to 90 weight percent para isomer and minor amounts, not exceeding 5 weight percent meta isomer, is polymerized under conditions resulting in a stereospecific polymer structure, that a highly advantageous product results. Mixtures of isomers of methylstyrene can be copolymerized to obtain crystalline copolymers by use of a stereospecific catalyst system, including an organometallic reducing agent and a halide of a transition metal at relatively low reaction temperatures, e.g. from about −10° C. to about 120° C. The nonsoluble polymer may then be crystallized by heating in vacuo or under an inert atmosphere until the X-ray spectra reveals crystalline regions. The crystalline copolymer of the invention contains approximately 12 to 15% ortho, approximately 82 to 85% para and trace amounts, i.e. less than 5%, and preferably less than 2%, of meta isomer randomly distributed. It has a melting point of approximately 210° C., relatively high density, crystalline X-ray spectra, 80% birefringence and low solubility in hydrocarbons. The stereospecific polymethylstyrene of the invention is most readily distinguishable from amorphous polymethylstyrene by its higher density of between about 1.020–1.080 as compared to amorphous polymethylstyrene density of from about 0.980–1.009. The polymerization system employed in copolymerizing the methylstyrene isomers in the preparation of the polymer of the invention comprises a metal halide catalyst in combination with an organometallic compound, and a suitable solvent for the monomeric mixture of the methylstyrene isomers.

The metal halide catalysts employed in practicing the present invention are halides of the transition metals of group IVB to group VIB of the periodic system which are substantially insoluble in hydrocarbons at normal temperatures, i.e. temperatures in the range of from about 10° C. to about 120° C. These metals include titanium, vanadium, chromium, zirconium and tungsten, etc. Transition metal halides useful in preparing the copolymer of the invention include the various di-, tri-, tetra-halides and higher valence metal halides of these metals. Suitable compounds of this type include titanium dichloride, titanium trichloride, titanium tetrachloride, as well as other halides of these metals, such as dichlorodibutoxytitanium [$TiCl_2(OC_4H_9)_2$], titanium tribromide, titanium triiodide, titanium tetrahydroxide, vanadium trichloride, chromium trichloride, zirconium trichloride, zirconium tetrachloride, tungsten hexachloride, and the like.

Suitable solvents for the polymer employed in preparing the catalyst are the aliphatic compounds having from about 6 up to 20 carbon atoms, or aromatic hydrocarbons. Examples of such solvents are benzene, toluene, n-hexane, n-heptane, xylene, tetrahydronaphthalene, and the like. Halogenated hydrocarbons, such as o-dichlorobenzene or chloronaphthalene may also be employed.

The catalyst system which comprises the above components is employed in a known manner, i.e. the transition metal halide is employed in conjunction with organometallic compounds of metals of group I to group III of the periodic system in initiating polymerization. Generally, aluminum organic compounds are utilized. As such are the trialkylaluminum compounds containing alkyl radicals up to 8 carbon atoms, i.e. methyl, ethyl, propyl, butyl, isopropyl or isobutyl radicals, for example, or mixtures of such radicals. Illustrative specific compounds of this type are such as triethyl aluminum, triisobutyl aluminum, diethylaluminum monochloride, monoethylaluminum dichloride and the like.

Other organometallic compounds include lithium, beryllium, magnesium, zinc, cadmium in which the metal is bonded to an alkyl radical, as named above. Specific illustrative examples include butyl lithium, diethyl magnesium, and diethyl beryllium.

The ratio of transition metal halide to monomeric material to be polymerized may be employed in amounts ranging from about 0.01 to about 10 percent by weight and preferably in amounts of from 0.05 to 5 percent by weight based on the polymerizable compound.

The weight ratio of transition metal halide to organometallic cocatalyst may vary from about 1:0.2 to about 1:20, but is preferably maintained wtihin the ratio range of from about 1:0.5 to 1:10, respectively.

In order that the invention may be more fully understood, the following examples are given by way of illustration and not by way of limitation. Parts are parts by weight unless otherwise expressly stated.

EXAMPLE 1

To a mixture of 3.18 parts (0.0206 mol) $TiCl_3$ and 1.37 parts of $Al(C_2H_5)_3$ which has been stirred at 70° C. for one-half hour is added dropwise 73 parts of methylstyrene (containing 33% ortho, 65% para and 2% meta-methylstyrene). After two hours stirring at 70° C. 144 parts of purified benzene is added and the reaction continued for 48 hours.

The polymer fraction found insoluble after extraction with hot acetone and methyl ethyl ketone is the stereospecific polymer. This fraction is purified by reprecipitating from hot, filtered toluene solution by methanol. The polymer is then crystallized by heating at 110° for 120 hours in vacuo.

The crystallized copolymer has a melting point of 206–210° (an increase of 50° C. over the noncrystalline copolymer) and a composition of about 85% para, about 15% ortho and trace of meta which did not change on partial extraction with hot methyl ethyl ketone. X-ray spectra was crystalline. The translucent molded film gave high scattering of infrared light typical of crystalline material. Molecular weight based on intrinsic viscosity of 4.1 corresponds to about $1.8 \times 10^6$.

The data summarized in Table I below, obtained from a series of runs substantially similar to Example 1, describes the characteristic distinctions ascertained between crystalline methylstyrene and amorphous methylstyrene. Each of the crystalline and amorphous polymers has isomeric proportions of ortho, meta and para within the limits above defined.

Table I

|  | Crystalline | Amorphous |
|---|---|---|
| X-ray crystallinity Analysis. | Positive | Negative. |
| Heat treatment, 130–200° C. | Enhanced crystallization. | No effect. |
| d-spacings (typical) | 12.1, 6.28, 5.05, 4.44 | None. |
| Melting point | 150–215° C | 95–125° C. |
| Density | 1.020–1.050 | 0.985–1.009. |
| Benzene solubility | 0.1% | About 10% or even more. |

EXAMPLE 2

The procedure of Example 1 is repeated employing 90 parts methylstyrene of the same isomer ratio of Example 1. Vanadium trichloride, 1.28 parts, is employed instead of titanium trichloride, together with 1.36 parts of triethylaluminum. The polymer is extracted and crystallized as described in Example 1. It has a density of 1.042 and melts at 212° C.

Primarily in order to accelerate crystallinity in the stereospecific polymer prepared according to the invention, it is preferred that the stereospecific polymethyl styrene prepared according to the process of the invention be heat-treated by heating at temperatures in the range of between about 120–180° C. under an inert atmosphere, i.e. either in vacuo or under an inert gas, e.g. nitrogen or helium for periods which may vary depending on conditions of from 1 hour and even less to as long as 120 hours or even longer.

Crystallization may also be accelerated by crystallizing the stereospecific polymer in a nonswelling solvent liquid as in the technique described by J. Williams JACS 79, 1716 (1957).

I claim:
1. A crystalline methylstyrene terpolymer of about 15 weight percent ortho isomer, of about 85% weight percent para isomer, the trace amounts not to exceed 2 weight percent meta isomer, the total percent of said isomers copolymerized in the terpolymer being 100%, said polymer having a density between 1.020 and 1.080, a melting point between 150° C. and 215° C., d-spacings of 12.1, 6.28, 5.05 and 4.44 and an intrinsic viscosity of about 4.1.

2. A method of making a crystalline polymer of methylstyrenes, said polymer having a density between 1.020 and 1.080, a melting point between 150° C. and 215° C., d-spacings of 12.1, 6.28, 5.05 and 4.44 and an intrinsic viscosity of about 4.1 which comprises reacting, in solution, at a temperature of from about −10° C. to about 120° C. and under an inert atmosphere, a monomer mixture of methylstyrenes comprising from about 10 to 40 weight percent ortho isomer, from 60 to 90 weight percent para isomer, and minor amounts but not more than 5 weight percent meta isomer, the total percent of the isomers in said monomer mixture being 100%, in admixture with a catalyst system comprising a mixture of (1) from about 0.1% to about 10% of titanium trichloride and (2) from about 0.01% to about 5% of triethyl aluminum, said percentages of catalyst being based on the total weight of the methylstyrene, and annealing under heat and in an inert atmosphere the fraction of the polymeric product which is insoluble in acetone and methyl ethyl ketone.

References Cited in the file of this patent
UNITED STATES PATENTS 2,816,095    Swanson     Dec. 10, 1957
2,827,447    Nowlin et al.     Mar. 18, 1958
2,832,759    Nowlin et al.     Apr. 29, 1958

OTHER REFERENCES

Moeller: "Inorganic Chemistry" (1952), page 405.